(12) United States Patent
Engström

(10) Patent No.: US 8,475,088 B2
(45) Date of Patent: Jul. 2, 2013

(54) DEVICE FOR MILLING OF MATERIALS

(75) Inventor: Tord Engström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 296 days.

(21) Appl. No.: 12/967,287

(22) Filed: Dec. 14, 2010

(65) Prior Publication Data

US 2011/0150583 A1    Jun. 23, 2011

(30) Foreign Application Priority Data

Dec. 18, 2009    (SE) ...................................... 0950990

(51) Int. Cl.
*B23C 5/16*    (2006.01)
(52) U.S. Cl.
CPC ........................ *B23C 5/16* (2013.01)
USPC .................... 407/61; 407/51; 407/53; 76/115
(58) Field of Classification Search
USPC .................. 407/40, 42, 47, 48, 51, 53, 54, 61
See application file for complete search history.

(56) References Cited

U.S. PATENT DOCUMENTS

| | | | | |
|---|---|---|---|---|
| 3,882,912 A | * | 5/1975 | Sybertz | 144/172 |
| 4,220,429 A | * | 9/1980 | Powers et al. | 408/224 |
| 4,411,563 A | * | 10/1983 | Moon | 407/54 |
| 5,876,155 A | | 3/1999 | Link et al. | |
| 7,399,146 B2 | | 7/2008 | Long, II et al. | |
| 2004/0170480 A1 | | 9/2004 | Kawai et al. | |
| 2006/0188345 A1 | * | 8/2006 | Greenwood et al. | 407/54 |
| 2009/0317198 A1 | * | 12/2009 | Hanks et al. | 407/54 |

FOREIGN PATENT DOCUMENTS

| EP | 1 276 580 | 12/2007 |
|---|---|---|
| WO | 2005/058534 | 6/2005 |
| WO | 2007/077535 | 7/2007 |

* cited by examiner

*Primary Examiner* — Daniel Howell
*Assistant Examiner* — Alan Snyder
(74) *Attorney, Agent, or Firm* — Morgan, Lewis & Bockius LLP

(57) ABSTRACT

A device and a method of making thereof includes a milling cutter body that is connectable to a rotatable spindle or holder. The milling cutter body is provided with at least one series of a plurality of tangentially spaced-apart cutting edges or a plurality of tangentially spaced-apart seats intended for milling inserts having at least one cutting edge. The cutting edges or seats of the series are arranged such that, within the series, a first angle between a radius that intersects a first cutting edge and a radius that intersects another cutting edge, which is situated closest to the first cutting edge in a direction of rotation around the rotation axis, is smaller than a second angle between the radius that intersects the first cutting edge and a radius that intersects another cutting edge, which is situated closest to the first cutting edge in a direction opposite the direction of rotation.

11 Claims, 6 Drawing Sheets

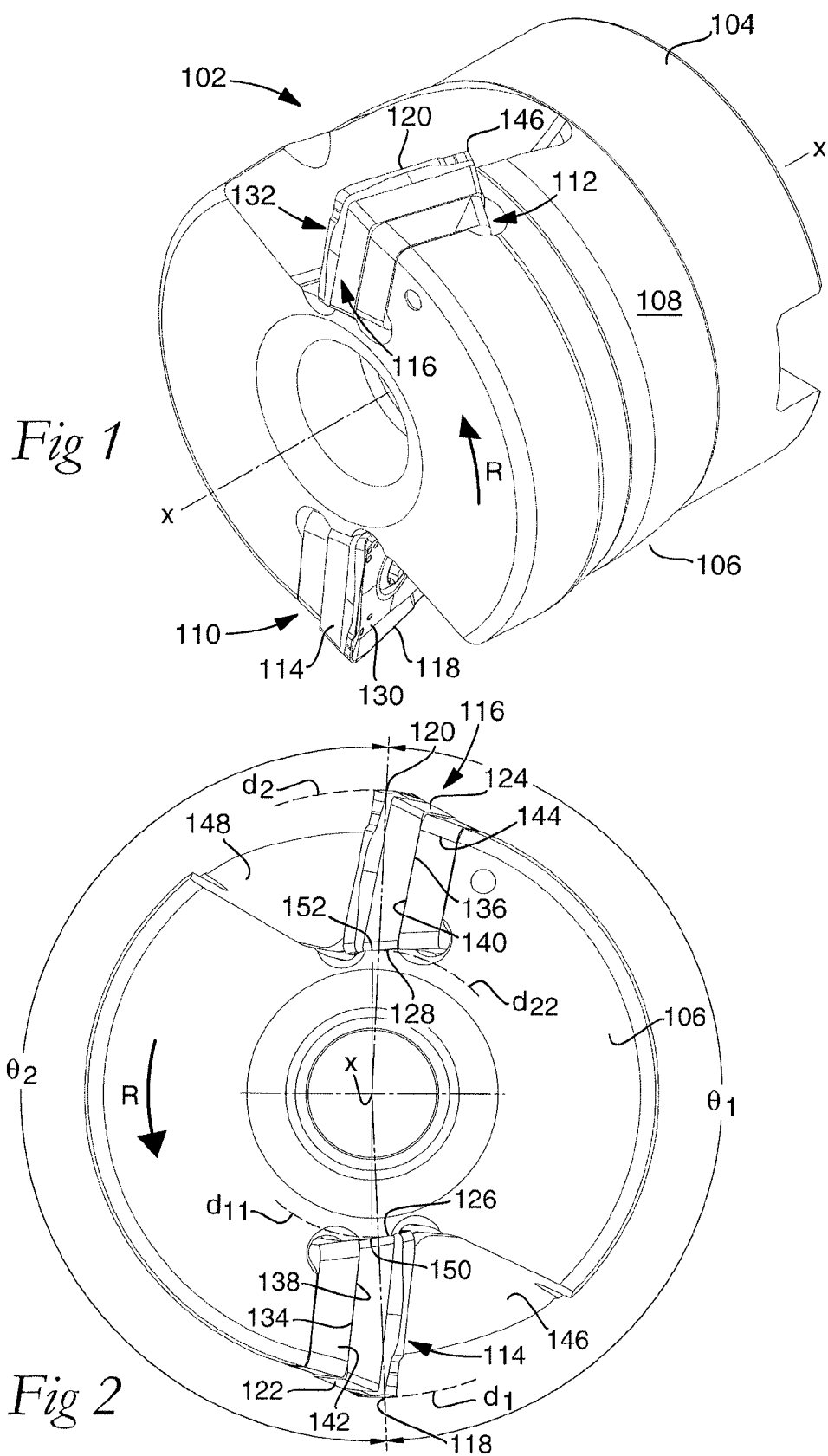

DEVICE FOR MILLING OF MATERIALS

CROSS-REFERENCE TO PRIOR APPLICATION

This application claims priority to Swedish Application No. 0950990-2 filed Dec. 18, 2009, which is incorporated by reference herein.

TECHNICAL FIELD

The present disclosure relates to a device for milling of materials, for instance titanium, steel, aluminium, castings or another material. The device includes a milling cutter body that is connectable to a rotatable spindle or holder and defines a rotation axis. The milling cutter body is provided with at least one series of a plurality of tangentially spaced-apart cutting edges or a plurality of tangentially spaced-apart seats intended for milling inserts having at least one cutting edge, with the cutting edges of the series being arranged to machine a common surface in a workpiece. The cutting edges or seats of the series are arranged in such a way that, within the series, a first angle between a radius that intersects a first cutting edge and a radius that intersects another cutting edge, which is situated closest to the first cutting edge in a direction of rotation around the rotation axis, differs from a second angle between the radius that intersects the first cutting edge and a radius that intersects another cutting edge, which is situated closest to the first cutting edge in the direction opposite the direction of rotation. The first and second angle are in a radial plane perpendicular to the rotation axis, and within the first and second angle, respectively, there is an absence of any other cutting edge of the same series. The present disclosure also relates to a method for setting and/or making such a device.

BACKGROUND ART

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

With the purpose of increasing the stability in milling, in particular face or end milling, of materials, such as titanium, steel, aluminium or castings, it is previously known to place the milling inserts that are in the same radial plane, for example, in the same horizontal plane if the rotation axis of the milling cutter body is vertical, with different or irregular angles between two adjacent milling inserts, for example, that there is around the circumference of the milling cutter body different or irregular distances in the rotational or peripheral direction between two adjacent milling inserts. This angular displacement of the milling inserts or uneven pitch of the milling inserts is denominated differential pitch. Differential pitch means that the engagement frequency of the milling inserts can be varied and the risk of self oscillations and instability can be reduced and an increased critical cutting engagement is obtained.

U.S. Pat. No. 5,876,155 discloses a method for plunge-cut milling wherein three milling inserts are situated at somewhat different radial distances from the rotation axis and wherein the milling inserts are intended to machine three different surfaces in the workpiece situated at different depths and having different angles. It is shown that the three milling inserts can be placed with differential pitch.

EP-B1-1 276 580 discloses a milling tool wherein a milling insert in a radial series of three milling inserts is situated at a greater radial distance from the rotation axis of the milling cutter body in relation to the two other milling inserts of the same radial series. By series, radial series, or radial set, it is meant that those milling inserts are essentially in the same radial plane, with the radial plane being perpendicular to the rotation axis of the milling tool.

U.S. Pat. No. 7,399,146 discloses a milling tool with differential pitch wherein a milling insert is angularly displaced in relation to the other two milling inserts of the same series, whereby different angles between the milling inserts are established.

WO-A1-2005/058534 discloses a milling tool having overlapping planes wherein a first milling insert in a chute has another length than the other milling inserts in the same chute.

US-A1-2004/0170480 and WO-A2-2007/077535 disclose end milling cutters or shank-end mills having different axial clearance angles and radial clearance angles, respectively, of the peripheral cutting edges of the respective end milling cutter.

SUMMARY

The present disclosure provides an improved and more efficient milling of materials, such as titanium, steel, aluminium, castings or another material. Also, the present disclosure provides an improved and more efficient face or end milling of materials, such as titanium, steel, aluminium, castings or another material.

An aspect of the invention provides a device for milling of materials that includes a milling cutter body that is connectable to a rotatable spindle or holder and defines a rotation axis. The milling cutter body is provided with at least one series of a plurality of tangentially spaced-apart cutting edges or a plurality of tangentially spaced-apart seats intended for milling inserts having at least one cutting edge, with the cutting edges of the series being arranged to machine a common surface in a workpiece. The cutting edges or seats of the series are arranged in such a way that, within the series, a first angle between a radius that intersects a first cutting edge and a radius that intersects another cutting edge, which is situated closest to the first cutting edge in a direction of rotation around the rotation axis, is smaller than a second angle between the radius that intersects the first cutting edge and a radius that intersects another cutting edge, which is situated closest to the first cutting edge in a direction opposite the direction of rotation. The first and second angle are in a radial plane perpendicular to the rotation axis, and within the first and second angle, respectively, there is an absence of any other cutting edge of the same series. Also, within the series, a radial distance of the first cutting edge to the rotation axis is larger than a radial distance of the another cutting edge, which is situated closest to the first cutting edge in the direction opposite the direction of rotation, to the rotation axis. The radial distances to the rotation axis lie in the radial plane.

Thus, within the series, the radial distance of at least one cutting edge to the rotation axis differs from the radial distance of at least one other cutting edge to the rotation axis, the radial distances to the rotation axis lying in the radial plane.

The angle formed between a radius that intersects a particular cutting edge and a radius that intersects another cutting edge situated closest to the particular cutting edge, which angle is in a radial plane perpendicular to the rotation axis, and within which angle there is an absence of any other cutting edge of the same series, is henceforth called the angle θ. The angle θ formed between a particular cutting edge and another cutting edge situated closest to the particular cutting edge in the direction of operational rotation of the milling cutter body, is henceforth denominated as if it "belongs to" the particular cutting edge, for example, "the angle θ of the cutting edge." Thus, the angle θ of a cutting edge affects how great a "chew" or chip that is cut by the workpiece after the cutting edge being in front in the direction of rotation has done the same. The greater the angle θ, the greater the chew.

A series of cutting edges or seats, can refer generally to cutting edges or seats on the same axial level in relation to the rotation axis of the milling cutter body, or it can refer to cutting edges or seats on the same vertical level if the rotation axis of the milling cutter body extends vertically. A plurality of cutting edges or seats, can refer to two or more cutting edges or seats. Tangentially spaced-apart cutting edges or seats, can reference the cutting edges or the seats being peripherally spaced-apart or spaced-apart around the rotation axis.

Tooth feed is a term or quantity that indicates the feed per tooth/cutting edge/milling insert. If, for example, a workpiece is fed 1 mm in relation to the milling tool while the milling tool rotates an entire revolution, i.e., 360°, and the milling tool has ten cutting edges in the same radial plane, the tooth feed will be 0.10 mm/tooth. In certain embodiments the tooth feed is 0.15 mm/tooth. The tooth feed can also be defined according to the following formula, wherein $v_z$ is the tooth feed, $v_f$ is the feed speed, n is the number of revolutions, and z is the number of milling inserts in the milling cutter:

$$f_z = \frac{v_f}{n \times z}$$

The inventors have recognized problems with the differential pitch of the prior art described above. Since the cutting edges and the milling inserts are unevenly distributed around the rotation axis of the milling cutter body, they are subjected to different loads during the milling operation, which results in reduced service life of the milling inserts and the cutting edges that are subjected to the greater load. This in turn results in limited service life of the entire milling cutter and the milling system and thereby results in lower productivity, because the milling inserts or milling cutter body have/has to be replaced, and therefore there arises shutdowns in the milling operation.

The inventors have further recognized that if a setting of the radial distance of one or more cutting edge to the rotation axis of the milling cutter body is carried out in a milling cutter body with differential pitch, so that cutting edges have different radial distances to the rotation axis, a more even chip thickness can be obtained. Therefore, there will be a more even load on the milling inserts and the cutting edges, and accordingly reduced load and reduced wear on the milling tool. Thus, the milling tool and the milling system can operate longer without shutdowns, because the milling inserts or the tool do/does not need to be replaced as often in comparison with the corresponding systems of the prior art, whereby the productivity is improved radically.

In certain embodiments, within a series of cutting edges in a milling cutting body, there is a first cutting edge; another second cutting edge, which is situated closest to the first cutting edge in a direction opposite a direction of rotation of the milling cutting body; and another third cutting edge, which is situated closest to the first cutting edge in the direction of rotation of the milling cutting body. The first cutting edge and the second cutting edge are arranged with different pitch, or in other words, a first angle $\theta_1$ of the first cutting edge differs from a second angle $\theta_2$ of the second cutting edge.

As discussed above, the first angle $\theta_1$ of the first cutting edge can be defined as the angle between a radius that intersects the first cutting edge and a radius that intersects the third cutting edge. The second angle $\theta_2$ of the second cutting edge can be defined as the angle between a radius that intersects the second cutting edge and a radius that intersects the first cutting edge.

In another embodiment, the first cutting edge and the second cutting edge, in addition to having different pitch, or in other words different angles θ, have different radial distances to the axis of rotation of the milling cutting body. In a particular embodiment, the radial distance of the first cutting edge to the rotation axis and the radial distance of the second cutting edge to the rotation axis are set in relation to the respective angles $\theta_1$, $\theta_2$. The first angle $\theta_1$ of the first cutting edge is smaller than the second angle ($\theta_2$) of the second cutting edge, wherein the second cutting edge is situated closest to the first cutting edge in the direction opposite the direction of rotation (R) of the milling cutting body and wherein the angles θ are defined as described above. The radial distance of the first cutting edge to the rotation axis and the radial distance of the second cutting edge to the rotation axis are set to these specific pitches (angles θ) such that the radial distance of the first cutting edge is longer than the radial distance of the second cutting edge. This is advantageous in that a tendency of the second cutting edge to cut chips having a greater chip thickness than chips cut by the first cutting edge, due to the larger angle θ of the second cutting edge, is counteracted by setting the second cutting edge with a shorter radial distance to the axis of rotation than the first cutting edge. In addition, a more even load on both milling inserts is achieved. In other words, the disadvantageous variations in chip thickness, which are associated with previously known tools, will be entirely eliminated or at least be essentially reduced thanks to the inventive radial positioning of the cutting edges.

The combination of differential pitch of the cutting edges of the milling cutter body (i.e., different angles θ within one and the same series) with different settings of the radial distances to the rotation axis for the cutting edges within the series, the above-mentioned positive effects of the differential pitch are obtained. For example, the risk of self oscillations and instability is reduced and the critical cutting engagement can be increased, at the same time as a reduced load and a reduced wear on milling inserts and cutting edges are achieved and an improved productivity is obtained. The critical cutting engagement normally embraces a combination of a critical axial cutting depth and a critical radial cutting depth, wherein most cases one of the critical cutting depths is dominating and primarily defines the critical engagement.

By the radial setting of the milling inserts or the cutting edges, the differences between the angles θ can also be further increased without getting an uneven load on the milling inserts, which gives an increased flexibility in the adaptation and the design of the milling cutter body to different types of milling operations and milling of different materials. By this, milling of materials, such as titanium, steel, aluminium, castings or another material, is improved and made more efficient.

Examples of how the radial setting of the radial distance of the respective cutting edge to the rotation axis is carried out in advantageous ways are described in more detail in the detailed description. The device may include one series or a plurality of series, including, for example, two or more series, having cutting edges or seats.

According to an advantageous embodiment of the device, the cutting edges within the same series intersect the radial plane.

According to an additional advantageous embodiment of the device, the respective cutting edge is provided adjacent to a clearance surface, and within the same series, the respective clearance surface forms an angle with the rotation axis, which is essentially as great as the corresponding angle of the clearance surface of the other cutting edges in the same series.

According to another advantageous embodiment of the device, the milling inserts in one and the same series have an essentially equally great axial tipping-in angle, and advantageously the milling inserts in one and the same series have an essentially equally great radial tipping-in angle.

According to another advantageous embodiment of the device, the milling inserts in one and the same series have an essentially similar geometrical basic shape.

According to another advantageous embodiment of the device, the milling inserts in one and the same series are essentially identical.

According to another advantageous embodiment of the device, within the series, the radial distance of the first cutting edge to the rotation axis differs from the radial distance to the rotation axis for the one of the other cutting edges of the series that is situated closest to the first cutting edge in the direction opposite the direction of rotation. In this embodiment, self oscillations are reduced and stability is further improved, the critical cutting engagement can be increased more, and load is reduced even more, whereby the milling of materials becomes more efficient.

According to yet another advantageous embodiment of the device, the first angle differs from the second angle by at least one percent, more advantageously by at least two percent, and even more advantageously by at least three percent.

According to an additional advantageous embodiment of the device, the milling cutter body is provided with at least one series of a plurality of tangentially spaced-apart cutting edges.

According to another advantageous embodiment of the device, with the milling cutter body being provided with at least one series of a plurality of tangentially spaced-apart cutting edges, the cutting edges are integrated with the milling cutter body. The combination of differential pitch and radial setting of the cutting edges to a milling cutter body having integrated cutting edges, an efficient milling cutter body of this type is obtained, whereby the productivity thereof is improved for the corresponding reasons as stated above.

According to yet another advantageous embodiment of the device, with the cutting edges being integrated with the milling cutter body, the milling cutter body has a first end portion and an opposite second end portion, the rotation axis of the milling cutter body extending between said two end portions, wherein the milling cutter body includes a plurality of chutes extending from the first end portion toward the second end portion, and the respective cutting edge is arranged between two chutes.

According to an additional advantageous embodiment of the device, the milling cutter body is provided with at least one series of a plurality of tangentially spaced-apart seats intended for milling inserts having at least one cutting edge. The seats are arranged for the mounting of detachably mounted milling inserts having at least one cutting edge. The combination of differential pitch and radial setting of the cutting edges to a milling cutter body having detachably mounted milling inserts results in a particularly efficient milling cutter body, whereby the productivity thereof is improved for the corresponding reasons as stated above.

The respective milling insert may advantageously be provided with a plurality of cutting edges and accordingly is indexable into a corresponding plurality of different active positions. The respective milling insert may, for example, be provided with two cutting edges and accordingly is indexable into two different active positions, or be provided with four cutting edges and accordingly be indexable into four different active positions. However, the respective milling insert may also be provided with only one cutting edge or with another number of cutting edges. In the respective active position, the milling insert may have a main cutting edge that extends in an essentially axial direction and a minor cutting edge that extends in an essentially radial direction from the only end of the main cutting edge. In the milling, both the main cutting edge and the minor cutting edge can engage with the workpiece, but it is the main cutting edge that is the primary active cutting edge of the milling insert and is responsible for the main part of the milling. Cutting edge refers to the main cutting edge. The radial distance between cutting edges and the rotation axis of the milling cutter body refers to the radial distance from the main cutting edge to the rotation axis.

The seat is arranged for the mounting of a milling insert, advantageously a detachable milling insert. The seat is usually in the form of a pocket that corresponds to the geometry of the milling insert. In order to mount a milling insert in a seat, mounting members are utilized. There are a plurality of different mounting members in the prior art, including, for example, a conventional fixing screw intended to be inserted through a central hole in the milling insert and to be received by, as well as engage with, a threaded hole in the seat. Another example of a mounting member is a clamp for the fixation of the milling insert in the seat.

According to another advantageous embodiment of the device, with the milling cutter body being provided with at least one series of a plurality of tangentially spaced-apart seats, the respective seat has a shoulder surface against which the milling insert is pressable to fix the radial position of the milling insert in relation to the rotation axis of the milling cutter body. Within the series, the radial distance of at least one shoulder surface to the rotation axis differs from the radial distance of at least one other shoulder surface to the rotation axis. This is an efficient way to radially set the respective cutting edge to achieve the combination of differential pitch and radial setting of the cutting edges for a milling cutter body having detachably mounted milling inserts. Initially, the milling cutter body is formed according to a certain specification, and the operator can replace milling inserts without problems.

According to yet another advantageous embodiment of the device, with the milling cutter body being provided with at least one series of a plurality of tangentially spaced-apart seats, the respective milling insert has a clearance surface to which the cutting edge of the milling insert connects and a second surface opposite the clearance surface. Within the series, the distance of at least one cutting insert between the clearance surface thereof and the second surface thereof differs from the distance between the clearance surface and the second surface of at least one other milling insert. This is an alternative and, on many occasions, advantageous way to radially set the respective cutting edge to achieve the combination of differential pitch and radial setting of the cutting edges for a milling cutter body having detachably mounted milling inserts. The milling inserts and seats can be indicated in various ways to facilitate replacement of milling inserts by the operator. This radial setting also provides flexibility, in that the radial distances of the cutting edges can be set afterwards.

According to yet another advantageous embodiment of the device, the respective milling insert has a chip surface between said clearance surface and said second surface, and an underside opposite the chip surface. Within the series, the distance of at least one cutting insert between the chip surface and the underside differs from the corresponding distance of at least one other milling insert. In this way, a flexible setting is obtained of the radial setting of the cutting edge as well as the differential pitch, wherein the radial setting of the cutting edge and the differential pitch can be changed by, for example, replacing a thin milling insert for a thicker milling insert, or vice versa.

According to another advantageous embodiment of the device, the respective seat has a bottom surface against which the underside of the milling insert is pressable. The bottom surface can be set in the tangential direction to set the angles θ and the differential pitch, and thereby also change the radial position of the cutting edge. According to yet another advantageous embodiment of the device, the respective seat is arranged to receive an intermediate element arranged on the bottom surface of the seat, against which the underside of the milling insert is pressable. By setting the thickness of this intermediate element in the tangential direction, or by entirely removing the intermediate element, the angles θ and the differential pitch can be set and adjusted, which also changes the radial position of the cutting edge.

According to an additional advantageous embodiment of the device, with the milling cutter body being provided with at least one series of a plurality of tangentially spaced-apart seats for the mounting of milling inserts having at least one cutting edge, the respective seat has setting means for the setting of the radial position of the milling insert in relation to the rotation axis of the milling cutter body, and setting means for the setting of the peripheral position of the milling insert in relation to the milling cutter body.

According to an advantageous embodiment of the device, the cutting edges of the series are arranged to cut chips from a workpiece that have essentially the same chip thickness as the chip thickness of the chips that are cut by the other cutting edges in the same series. The cutting edges of the series are disposed by arranging the respective cutting edge with the correct radial distance to the rotation axis in relation to the angle θ thereof, and advantageously also taking the selected tooth feed into account. The selected tooth feed can be the optimal tooth feed, or the device may also be used at other tooth feeds with improved function.

According to an additional advantageous embodiment of the device, the milling cutter body is arranged for end milling and/or face milling of materials. The inventors have recognized that the combination of differential pitch and radial setting of the cutting edges is particularly efficient in end milling and/or face milling of materials, whereby the milling of materials becomes even more efficient.

In the embodiments described above, the milling cutter body, or the tool body, is advantageously manufactured from a material that is softer than the material of the milling inserts. The milling inserts may, for example, be manufactured from a cemented carbide while the milling cutter body is manufactured from steel. In the embodiments where the cutting edges are integrated with the milling cutter body, the milling cutter body as well as the cutting edges may be formed of cemented carbide.

Another aspect of the invention includes a method for setting and/or making the device for milling of materials defined above. The method includes the following steps: determination of the number of cutting edges in one and the same series; within the series, setting of the respective angle formed between the radii each one of which intersects one of the cutting edges of the determined number of cutting edges, the angles being in one and the same radial plane perpendicular to the rotation axis of the milling cutter body; determination of the tooth feed of the milling operation; and within the series, setting of the radial distance of at least one cutting edge to the rotation axis based on the determined tooth feed and set angles between the cutting edges in the radial plane. The radial distances to the rotation axis lie in said radial plane. The set or made device is optimized for the determined tooth feed, but the device may also be used at other tooth feeds with improved function.

The device is also applicable to split milling tools with the milling tool including detachable inserts provided with cutting edges, which inserts are connected to a milling cutter body, including, for example, that the milling cutter body may include a detachable milling cutter body part, including milling inserts, that is connectable to the milling cutter body, or that the milling cutter body is connected to another unit or holder, which in turn is connected to a spindle.

The device and the method thereof are in particular advantageous and efficient for metal materials, such as titanium, steel, aluminium and castings.

Additional advantageous embodiments of the device and the method thereof are seen in the detailed description of embodiments.

It is to be understood that both the foregoing general description and the following detailed description are exemplary and explanatory and are intended to provide further explanation of the invention as claimed.

BRIEF DESCRIPTION OF THE DRAWINGS

The present invention will now, for exemplifying purposes, be described more thoroughly by means of embodiments and with reference to the accompanying drawings, in which:

FIG. 1 is a schematic perspective view of a first embodiment of the device, as seen obliquely from below, FIG. 2 is a schematic bottom view of the device in FIG. 1.

DETAILED DESCRIPTION OF PREFERRED EMBODIMENTS

Figure 2A:
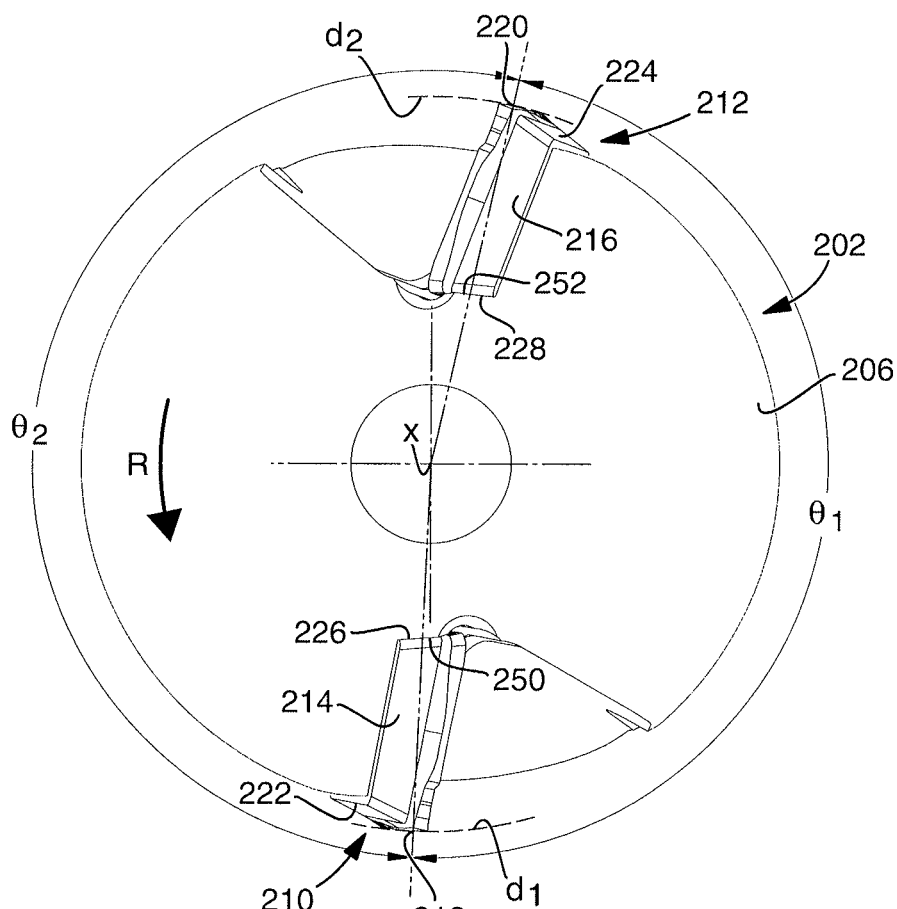
FIG. 2a is a schematic bottom view of a second embodiment of the device.

FIG. 1 shows a first embodiment of the device in the form of a milling tool for chip removing machining of metal, including a milling cutter body 102 having a rear part 104 for the attachment in a rotatable tool holder and a front main part 106 the envelope surface 108 of which, in the example shown, has a cylindrical basic shape, but also another rotationally symmetrical basic shape is possible, for example, conical. The milling cutter body 102 defines a rotation axis x-x, that is also a longitudinal center axis of the milling cutter body 102, and is provided with a series of two tangentially spaced-apart seats 110, 112, or pockets, for detachably mounted milling inserts 114, 116. The seats 110, 112 of the series are spaced-apart around the periphery of the milling cutter body 102 or in the direction of rotation. The respective milling insert 114, 116 is provided with at least one cutting edge 118, 120, which is in an active position in the milling operation, and a second cutting edge, in this embodiment, the respective milling insert 114, 116 being provided with four cutting edges and accordingly being indexable into four different active positions. The milling insert may also be provided with only one or with another number of cutting edges. In this embodiment, all milling inserts 114, 116 have the same dimensions. The seats 110, 112 of the series are generally on the same axial level in relation to the rotation axis x-x of the milling cutter body 102, and the cutting edges 118, 120 of the series are arranged to machine a common surface in a workpiece, for example, in end milling or face milling. In this embodiment, as well as in the embodiments of FIGS. 2a and 3-5, the milling insert 114, 116 has in the active position a main cutting edge 118, 120 that extends between the rear part 104 of the milling cutter body 102 and the end portion of the front part 106 of the milling cutter body 102, or, alternatively expressed, extends in an essentially axial direction, and a minor cutting edge that extends in an essentially radial direction from the only end of the main cutting edge 118, 120. The minor cutting edge has a considerably shorter length than the main cutting edge 118, 120. It is the main cutting edge 118, 120 that it is the primary active cutting edge of the milling insert 114, 116, and when the term "cutting edge" is used in this application, the main cutting edge is intended. The radial distances between cutting edges and the rotation axis of the milling cutter body discussed in the following refer to the radial distance from the main cutting edge to the rotation axis.

With reference to FIG. 2, which shows a schematic bottom view of the device in FIG. 1 and where R shows the direction of operational rotation of the milling cutter body 102, the respective milling insert 114, 116 has a clearance surface 122, 124 to which the cutting edge 118, 120 of the milling insert 114, 116 connects and a second surface 126, 128 opposite the clearance surface 122, 124. The respective milling insert 114, 116 has also a chip surface 130, 132 between said clearance surface 122, 124 and said second surface 126, 128, and an underside 134, 136 opposite the chip surface 130, 132. The respective seat 110, 112 has a bottom surface 138, 140 against which the underside 134, 136 of the milling insert 114, 116 is pressable. The respective seat 110, 112 is provided with an intermediate element 142, 144 on which the bottom surface 138, 140 of the seat 110, 112 is arranged. The seats 110, 112 have been displaced around the rotation axis x-x in relation to each other so that the first cutting edge 118 has obtained an angle θ, $\theta_1$, of 175°, and the second cutting edge 120 has obtained an angle θ, $\theta_2$, of 185° in the same radial plane that is perpendicular to the rotation axis x-x, wherein $\theta_1$ differs from $\theta_2$. The seats 110, 112 are arranged so that the cutting edges 118, 120 of the milling inserts 114, 116 within the same series intersect the radial plane in which the angles θ, $\theta_1$, $\theta_2$, of the cutting edges 114, 116 lie. The respective milling insert 114, 116 adjoins an essentially axially extending chute 146, 148 that serves as a chip channel in the area upstream the milling inserts 114, 116.

Alternatively, the displacement of the seats 110, 112 around the rotation axis x-x may have been established by different thicknesses in the tangential direction of the milling inserts or different thicknesses of the intermediate elements. In the embodiment described above, the intermediate element 142 of the first cutting edge 118 could, for example, be thicker in the tangential direction than the intermediate element 144 of the second cutting edge 120.

The respective seat 110, 112 has a shoulder surface 150, 152 against which the milling insert 114, 116 with the second surface 126, 128 thereof is pressable to fix the radial position of the milling insert 114, 116 in relation to the rotation axis x-x of the milling cutter body 102, and thereby also the radial position of the cutting edge 118, 120 in relation to the rotation axis x-x. The radial distance between the shoulder surface 150 of the first seat 110 and the rotation axis x-x is $d_{11}$, and the radial distance between the shoulder surface 152 of the second seat 112 and the rotation axis x-x is $d_{22}$. To obtain an even chip thickness, the radial distance $d_{22}$ is smaller than the radial distance $d_{11}$, and by this difference of the radial distances $d_{11}$, $d_{22}$, the radial distance $d_2$ of the second cutting edge 120 to the rotation axis x-x is smaller than the radial distance $d_1$ of the first cutting edge 118 to the rotation axis x-x. The radial distances $d_{11}$, $d_{22}$, $d_1$, $d_2$ to the rotation axis x-x lie in the same radial plane as the angles θ of the cutting edges 118, 120.

When the first cutting edge 118 is at a nominal radial distance $d_1$ to the rotation axis x-x, $d_2$ can be obtained by decreasing $d_1$ by approx. 2.8% of a selected tooth feed. In certain embodiments, when the tooth feed is 0.30 mm and a nominal radial distance $d_1$ is 30 mm, $d_2$ can be set to 29.993 mm. The selected tooth feed refers to the tooth feed for which the milling cutter body/device is optimized, or the milling cutter body/device may also be used for other tooth feeds and still achieve an acceptable milling.

If the radial distances $d_1$, $d_2$ of the cutting edge 118, 120 to the rotation axis x-x had been equally large in combination with the angles θ in FIG. 2, the second cutting edge 120 would have cut chips having a noticeably greater chip thickness than the first cutting edge 118, which would have resulted in an increased load on the second milling insert 116, and thus an uneven load on the milling inserts 114, 116. By the second cutting edge 120 being shifted radially inward toward the rotation axis x-x, or alternatively by the first cutting edge 118 being shifted radially outward from the rotation axis x-x, the second cutting edge 120 cuts chips having a chip thickness that better corresponds to the chip thickness of the chips that the first cutting edge 118 cuts, and an even load on both milling inserts 114, 116 is achieved. In other words, the disadvantageous variations in chip thickness, which are associated with previously known tools, will be entirely eliminated or at least be essentially reduced thanks to the radial positioning of the cutting edges.

In FIG. 2a, a bottom view is shown of a second embodiment of the device in the form of a milling tool for chip removing machining of metal, which generally corresponds to the milling tool in FIG. 1 but where the intermediate elements are excluded from the respective seat 210, 212. R shows the direction of operational rotation of the milling cutter body 202. In addition, the seats 210, 212 have another displacement, and here have been displaced around the rotation axis x-x in relation to each other so that the first cutting edge 218 has obtained an angle θ, $\theta_1$, of 170°, and the second cutting edge 220 has obtained an angle θ, $\theta_2$, of 190° in the same radial plane that is perpendicular to the rotation axis x-x, and thus $\theta_1$ is 20° smaller than $\theta_2$. The seats 210, 212 are arranged so that the cutting edges 218, 220 of the milling inserts 214, 216 within the same series intersect the radial plane in which the angles θ, $\theta_1$, $\theta_2$, of the cutting edge 214, 216 lie.

In this second embodiment, the radial distance between the shoulder surface 250 of the first seat 210 and the rotation axis x-x is as great as the radial distance between the shoulder surface 252 of the second seat 212 and the rotation axis x-x, and instead, within the series, the distance of the first milling insert 214 between the clearance surface 222 thereof and the second surface 226 thereof is greater than the distance between the clearance surface 224 and the second surface 228 of the second milling insert 216, and thus, the first milling insert 214 has a longer extension in the radial direction than the second milling insert 216. By this difference of the milling inserts 214, 216, the radial distance $d_1$ of the first cutting edge 218 to the rotation axis x-x is greater than the radial distance $d_2$ to the rotation axis x-x of the second cutting edge 220, which is situated closest to the first cutting edge 218 in the direction opposite the direction of rotation R. The radial distances $d_1$, $d_2$ to the rotation axis x-x lie in one and the same radial plane as the angles θ of the cutting edges 218, 220. When $θ_1$ is 170° and $θ_2$ is 190° and the first cutting edge 218 is at a nominal radial distance $d_t$ to the rotation axis x-x, $d_2$ can be obtained by decreasing $d_1$ by approx. 5.6% of a selected tooth feed. In certain embodiments, where the tooth feed is 0.15 mm and a nominal radial distance $d_t$ is 30 mm, $d_2$ can be set to 29.9916 mm. Thanks to this radial positioning of the cutting edges, the disadvantageous variations of chip thickness, which are associated with previously known tools, will be entirely eliminated or at least essentially reduced.

Figure 8:
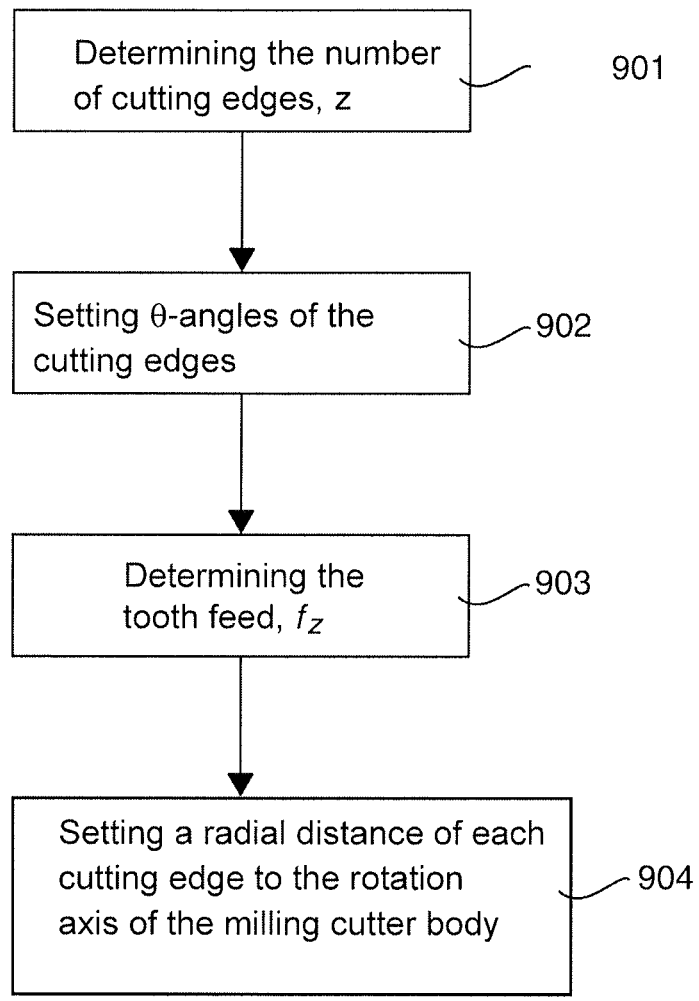
FIG. 8 is a flow chart that illustrates aspects of the method.

The above-mentioned percentages of the radial distance of the respective cutting edge to the rotation axis are only examples, and depending on the tooth feed, or the tooth feed interval, at which the milling cutter body is to be used, other percentages may be advantageous. With reference to FIG. 8, a more detailed description is given of examples of how the radial distances of the cutting edges to the rotation axis may be set in an advantageous way.

In FIGS. 1-2a, the milling inserts 114, 116, 214, 216 have a positive axial tipping-in angle. For example, the lower part of the chip surface 130, 132 of the milling insert 114, 116, 214, 216, and the part closest to the end portion of the front main part 106, 206, is heading the upper part of the chip surface 130, 132 of the milling insert 114, 116, 214, 216 and the part closest to the rear part 104, in the direction of operational rotation of the milling cutter body 102, 202. Alternatively expressed, the milling insert leans backward/upward as viewed in side view and in relation to the direction of operational rotation of the milling cutter body. In FIGS. 1-2a, the milling inserts have in addition a negative radial tipping-in angle. Here, the axial tipping-in angle is essentially equally great for all milling inserts of the series, and here, the radial tipping-in angle is essentially equally great for all milling inserts of the series.

The angles θ and the radial distances are in a radial plane that intersects the upper corner 146 (see FIG. 1) of the respective cutting edge 118, 120, 218, 220 where the upper corner 146 is situated closer to the rear part 104 of the milling cutter body 102, 202.

Figure 3:
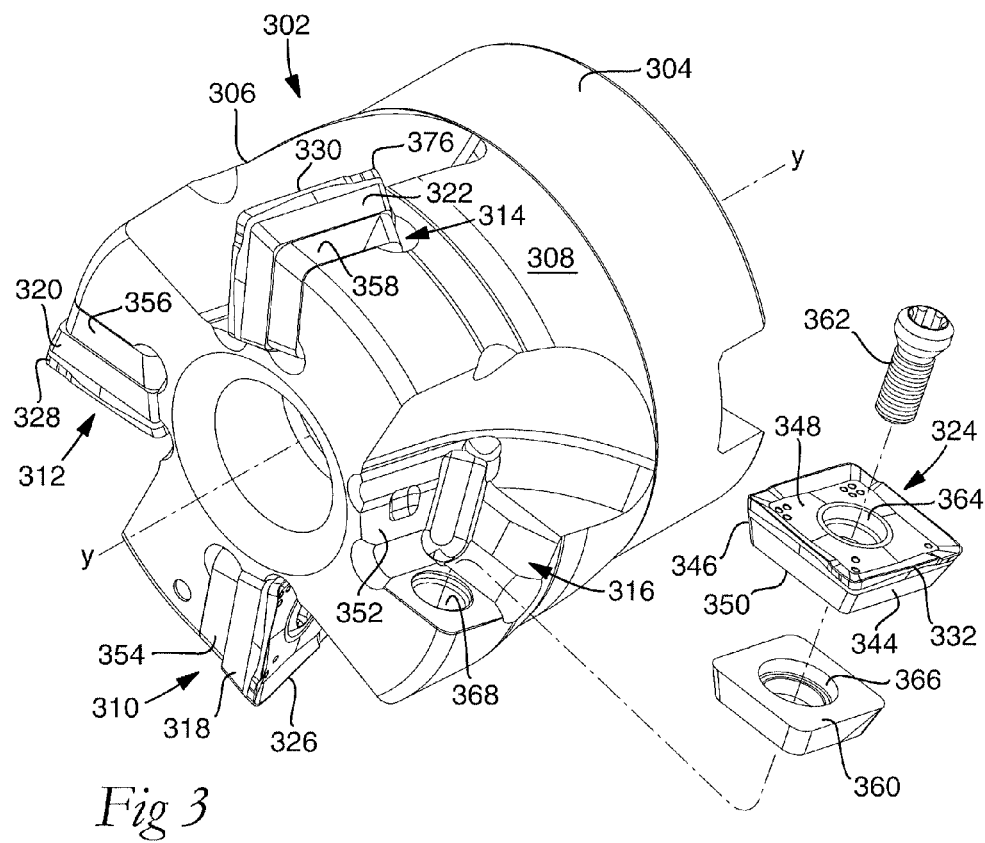
FIG. 3 is a schematic perspective view of a third embodiment of the device, as seen obliquely from below and illustrating the mounting of a milling insert.
Figure 4:
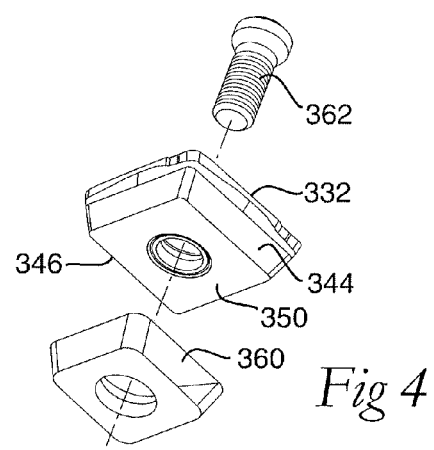
FIG. 4 is a schematic perspective view of a detachable milling insert having mounting members.

FIG. 3 shows a third embodiment of the device in the form of a milling tool for chip removing machining of metal, including a milling cutter body 302 having a rear part 304 for the attachment in a machine tool (not shown) and a front main part 306 the envelope surface 308 of which, in the example shown, has a cylindrical basic shape. The milling cutter body 302 defines a rotation axis y-y, which is also a longitudinal center axis of the milling cutter body 302, and is provided with a series of four tangentially spaced-apart seats 310, 312, 314, 316 for the mounting of detachable milling inserts 318, 320, 322, 324, with the four milling inserts 318, 320, 322, 324 having the same geometry. The respective milling insert 318, 320, 322, 324 is provided with at least one cutting edge 326, 328, 330, 332, which is in an active position in the milling operation, and a second cutting edge. In this embodiment, the respective milling insert 318, 320, 322, 324 is provided with four cutting edges and accordingly is indexable into four different active positions. In this third embodiment, all milling inserts 318, 320, 322, 324 have the same dimensions. With reference to FIGS. 3 and 4, the respective milling insert 318, 320, 322, 324 has a clearance surface 344 to which the cutting edge 332 of the milling insert 324 connects and a second surface 346 opposite the clearance surface 344. The respective milling insert 324 has also a chip surface 348 between said clearance surface 344 and said second surface 346, and an underside 350 opposite the chip surface 348. The cutting edges 326, 328, 330, 332 of the series are arranged to machine a common surface in a workpiece, for example, in end milling or face milling. The respective seat 310, 312, 314, 316 has a shoulder surface 352 against which the milling insert 324 with the second surface 346 thereof is pressable to fix the radial position of the milling insert 318 in relation to the rotation axis y-y of the milling cutter body 302, and thereby also the radial position of the cutting edge 332 in relation to the rotation axis y-y of the milling cutter body 302. In this embodiment, the respective seat 310, 312, 314, 316 is provided with an intermediate element 354, 356, 358, 360 each, and the respective milling insert 318, 320, 322, 324 is mounted in the seat 310, 312, 314, 316 thereof by means of a threaded screw element 362, which engages a central through recess 364 in the milling insert 318 and engages a threaded recess 368 arranged in the seat 310 via a through recess 366 in the intermediate element 360.

Figure 5:
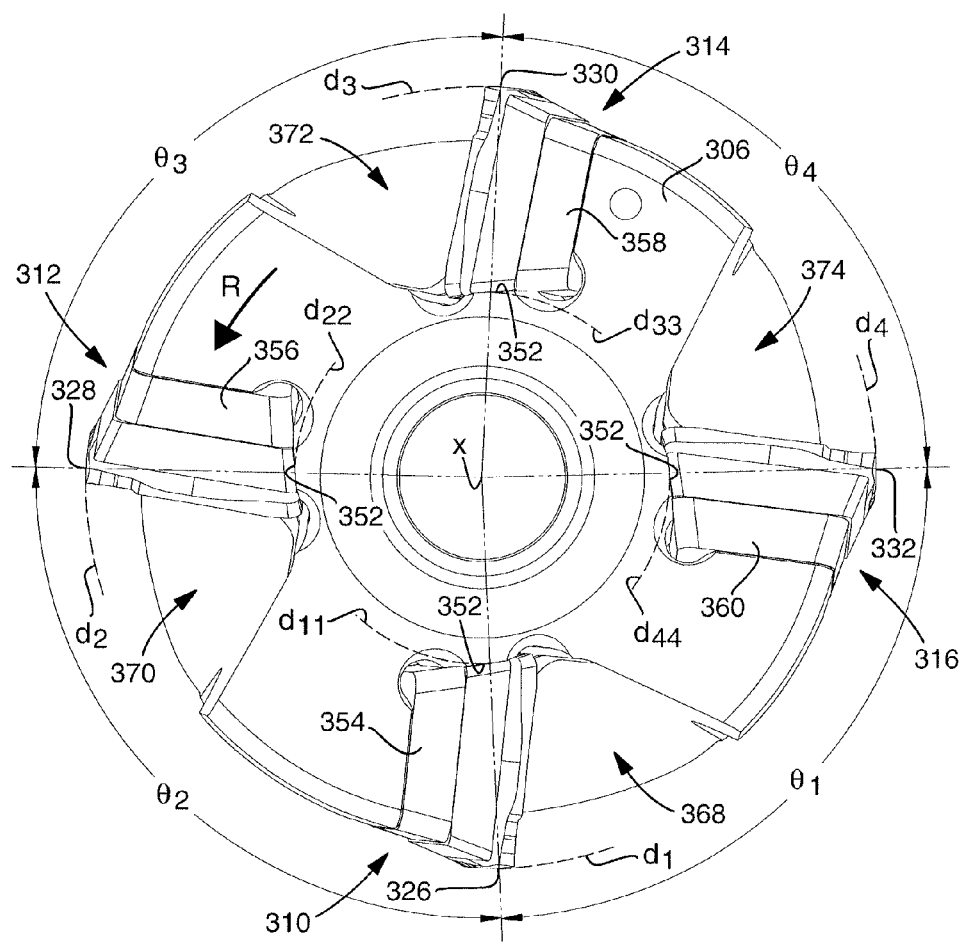
FIG. 5 is a schematic bottom view of the device in FIG. 3.

With reference to FIG. 5, which shows a schematic bottom view of the device in FIG. 3 and where R shows the direction of operational rotation of the milling cutter body 302, the seats 310, 312, 314, 316 have been displaced around the rotation axis y-y in relation to each other so that the first cutting edge 326 has obtained an angle θ, $θ_1$, of 85°, the second cutting edge 328 has obtained an angle θ, $θ_2$, of 88°, the third cutting edge 330 has obtained an angle θ, $θ_3$, of 95°, and the fourth cutting edge 332 has obtained an angle θ, $θ_4$, of 92° in the same radial plane that is perpendicular to the rotation axis y-y. In this embodiment, the displacement of the seats 310, 312, 314, 316 around the rotation axis x-x has been established by the design of the milling cutter body 302. The intermediate elements 354, 356, 358, 360 have, in relation to each other, the same thickness in the tangential direction. Alternatively, angular displacement around the rotation axis could be obtainable by giving the milling inserts different thickness in the tangential direction. The seats 310, 312, 314, 316 are arranged so that the cutting edges 326, 328, 330, 332 within the same series intersect the radial plane in which the angles θ, $θ_1$, $θ_2$, $θ_3$, $θ_4$, of the cutting edges 326, 328, 330, 332 lie. The respective milling insert 318, 320, 322, 324 adjoins an essentially axially extending chute 368, 370, 372, 374 that serves as a chip channel in the area upstream the milling inserts 318, 320, 322, 324.

The radial distance of the first cutting edge 326 to the rotation axis y-y is $d_1$, the radial distance of the second cutting edge 328 to the rotation axis is $d_2$, the radial distance of the third cutting edge 330 to the rotation axis y-y is $d_3$, and the radial distance of the fourth cutting edge 332 to the rotation axis y-y is $d_4$. The radial distance $d_4$ is selected to the nominal radial distance and is left unadjusted. To obtain an even chip thickness according to the present invention, $d_1$ can be obtained by increasing $d_4$ by approx. 5.6% of a selected tooth feed, $d_2$ can be obtained by increasing $d_4$ by approx. 7.8% of the selected tooth feed, and $d_3$ can be obtained by increasing $d_4$ by approx. 2.2% of the selected tooth feed. For a selected tooth feed of 0.15 mm and a nominal radial distance $d_4$ of 30 mm, $d_1$ can be set to 30.0084 mm, $d_2$ can be set to 30.0117 mm, and $d_3$ can be set to 30.0033 mm. Thanks to this radial positioning of the cutting edges, the disadvantageous variations of chip thickness, which are associated with previously known tools, will be entirely eliminated or at least essentially reduced.

In this embodiment, the above-mentioned differences, within the series, in the radial distances $d_1$, $d_2$, $d_3$, $d_4$ of the cutting edges 326, 328, 330, 332 to the rotation axis y-y are obtained by arranging the shoulder surface 352 of the seats 310, 312, 314, 316 with different radial distances $d_{11}$, $d_{22}$, $d_{33}$, $d_{44}$. What radial distances $d_{11}$, $d_{22}$, $d_{33}$, $d_{44}$ provide the above-mentioned radial distances $d_1$, $d_2$, $d_3$, $d_4$ are realized by a person skilled in the art based on the dimensions of the milling inserts. With reference to FIG. 8, a more detailed description is given of examples of how the radial distances of the cutting edges to the rotation axis can be set in an advantageous way.

In FIGS. 3 and 5, the milling inserts 318, 320, 322, 324 have a positive axial tipping-in angle and a negative radial tipping-in angle. In this embodiment, the axial tipping-in angle is essentially equally great for all milling inserts of the series, and the radial tipping-in angle is essentially equally great for all milling inserts of the series.

Here, the angles θ and the radial distances are in the radial plane that intersects the upper corner 376 (see FIG. 3) of the respective cutting edge 326, 328, 330, 332, where the upper 376 corner is situated closer to the rear part 304 of the milling cutter body 302.

Figure 6:
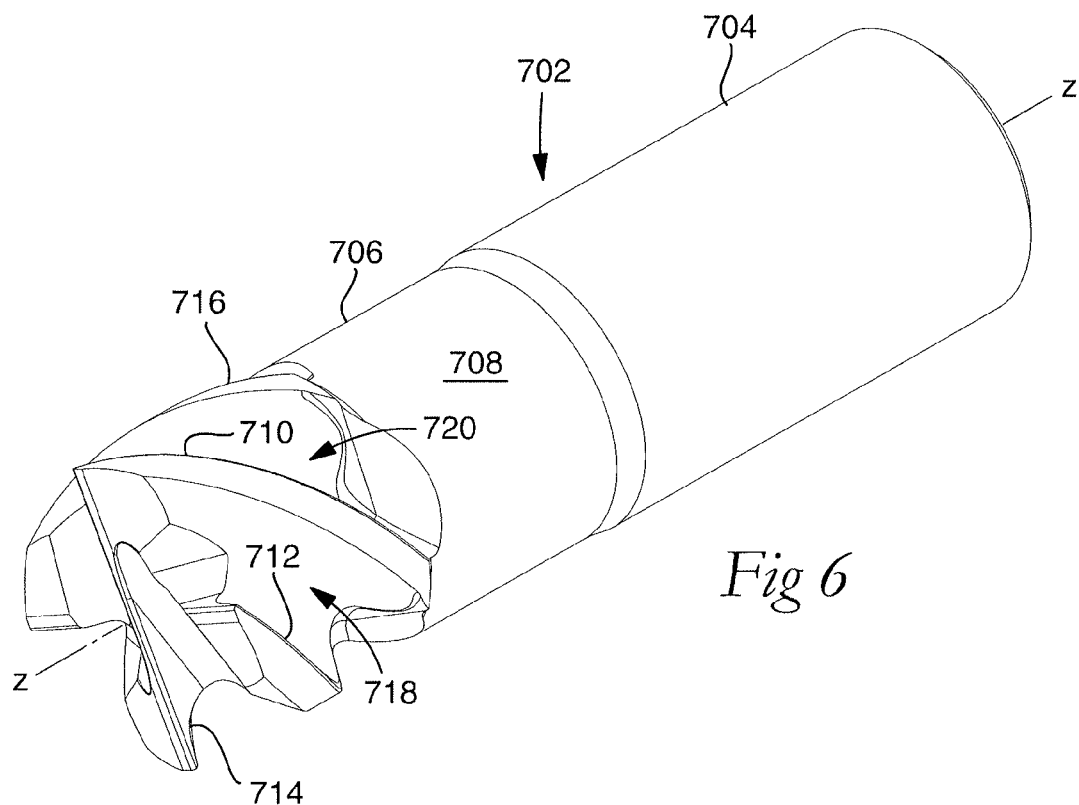
FIG. 6 is a schematic perspective view of a fourth embodiment of the device, as seen obliquely from below.
Figure 7:
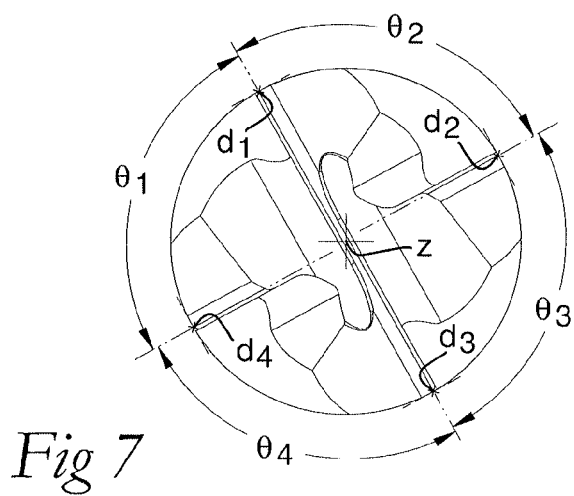
FIG. 7 is a schematic bottom view of the device in FIG. 6.

FIG. 6 shows a schematic perspective view of a fourth embodiment of the device according to the present invention, as seen obliquely from below, in the form of a shank-end mill for chip removing machining of metal, including a milling cutter body 702 having a rear part 704 for the attachment in a rotatable tool holder and a front main part 706 the envelope surface 708 of which, in the example shown, has a cylindrical basic shape. The milling cutter body 702 defines a rotation axis z-z, which is also a longitudinal center axis of the milling cutter body 702, and is provided with four peripheral cutting edges 710, 712, 714, 716 that are integrated with the milling cutter body 702 and arranged to machine a common surface in a workpiece. The milling cutter body 702 includes four chutes 718, 720, each of which extends along a helical shape from the end portion of the main part 706 toward the rear part 704, the respective cutting edge 710, 712, 714, 716 being arranged between two chutes 718, 720 and also extending from the end portion of the main part 706 toward the rear part 704. With reference to FIG. 7, wherein R shows the direction of operational rotation of the milling cutter body 702, the cutting edges 710, 712, 714, 716 have been displaced around the rotation axis z-z in relation to each other so that the first peripheral cutting edge 710 has obtained an angle θ, $θ_1$, of 85°, the second peripheral cutting edge 712 has obtained an angle θ, $θ_2$, of 88°, the third peripheral cutting edge 714 has obtained an angle θ, $θ_3$, of 95°, and the fourth peripheral cutting edge 716 has obtained an angle θ, $θ_4$, of 92° in one and the same radial plane perpendicular to the rotation axis z-z, the cutting edges 710, 712, 714, 716 intersecting the radial plane in which the angles θ of the cutting edges 710, 712, 714, 716 lie.

The radial distance of the first peripheral cutting edge 710 to the rotation axis z-z is $d_1$, the radial distance of the second peripheral cutting edge 712 to the rotation axis is $d_2$, the radial distance of the third peripheral cutting edge 714 to the rotation axis z-z is $d_3$, and the radial distance of the fourth peripheral cutting edge 716 to the rotation axis z-z is $d_4$. The radial distance $d_4$ is selected to a nominal radial distance and is left unadjusted. Since the angles θ in this embodiment correspond to the angles θ in the third embodiment according to FIGS. 3-5, the radial distances $d_1$, $d_2$, $d_3$ can be set to the corresponding distances for the same tooth feed of 0.15 mm and for the same nominal radial distance $d_4$ of 30 mm, whereby $d_i$ can be set to 30.0084 mm, $d_2$ can be set to 30.0117 mm, and $d_3$ can be set to 30.0033 mm. Thanks to this radial positioning of the cutting edges, the disadvantageous variations of chip thickness, which are associated with previously known tools, will be entirely eliminated or at least essentially reduced.

In the embodiments described above, the milling cutter body is advantageously manufactured from a material that is softer than the material of the milling inserts. The milling inserts may, for example, be manufactured from a cemented carbide while the milling cutter body is manufactured from steel. The respective milling cutter body 102, 202, 302, 702 in the embodiments described above is arranged for end milling and/or face milling of materials.

FIG. 8 shows a flow chart illustrating aspects of the method for the setting and/or making of a milling tool for milling of materials, wherein the milling tool may be any one of the sorts described according to the above. First, the number of cutting edges, z, to be situated in the same series is determined, in step 901. Next, within the series, different angles θ are set for the cutting edges, in step 902. The setting of the angles θ can be accomplished according to several different schemes or specifications and may depend on in which type of milling operation the milling tool is to be used, for example, which materials that are to be milled, and at how great cutting engagements the milling tool should operate, for example, how great axial depths that are to be milled by the milling tool, etc. In the prior art, there are several methods for setting of the differential pitch, including, for example, setting of the angles θ. The tooth feed, $f_z$, or the interval of the tooth feed $f_z$, for which the milling tool is to be optimized is determined, in step 903. A nominal radial distance d is determined, and a cutting edge is selected as reference and the radial distance thereof to the rotation axis of the milling cutter body is set to the determined nominal radial distance. Within the series, the radial distance of the other cutting edges to the rotation axis of the milling cutter body is then set in relation to the nominal radial distance and based on the determined tooth feed $f_z$ and set angles θ, in step 904. The cutting edge that is selected as reference is kept unadjusted. The precise setting of the radial distance of the respective cutting edge to the rotation axis may be made based on accomplished tests.

The setting of the radial distance $d_n$ of a particular cutting edge may also emanate from the following formula and the relation to the nominal radial distance d, wherein the reference cutting edge at a position n=0 has the nominal radial distance d to the rotation axis and the reference cutting edge is kept unadjusted:

$$\Delta d_n = f_z \left( n - \frac{V_n \times z}{360°} \right)$$

wherein z is the number of cutting edges in the series, f is the determined tooth feed, n indicates the position of the cutting edge, and $V_n$ is the angle in the radial plane between the cutting edge at the position n and the reference cutting edge at the position n=0. The radial distance $d_n$ of the cutting edge at the position n is then obtained from the nominal radial distance d and $\Delta d_n$ according to the following: $d_n = d + \Delta d_n$.

With reference to FIG. 5, the first cutting edge 326 has, according to this formula, the position n=1, the second cutting edge 328 has the position n=2, the third cutting edge 330 has the position n=3 and the fourth cutting edge 332 has the position n=0. For the first cutting edge 326, $V_1=\theta_1$ for the second cutting edge 328, $V_2=\theta_1+\theta_2$, and for the third cutting edge 330, $V_3=\theta_1+\theta_2+\theta_3$. For the third cutting edge according to FIG. 5 then:

$$\Delta d_3 = 0,15\left(3 - \frac{(85°+88°+95°)\times 4}{360°}\right) \text{ mm} = 0.0033 \text{ mm}$$

and $d_3$=30+0.0033 mm.

This is only one example of setting of the radial distance of the cutting edge and also other formulas and methods may be used within the scope of the present invention. $\Delta d_n$ is advantageously at least one percent of the determined tooth feed $f_z$. The set or made milling tool is optimized for the determined tooth feed, but the milling tool may also be used for other tooth feeds and still achieve an improved function.

The invention shall not be considered to be limited to the embodiments illustrated above but may be modified and altered in many ways within the scope of the accompanying claims. The number of cutting edges may, example, be more in number than what has been described above.

The invention claimed is:

1. Device for milling of materials, comprising:
a milling cutter body that is connectable to a rotatable spindle or holder and defines a rotation axis, the milling cutter body being provided with at least one series of a plurality of tangentially spaced-apart cutting edges or a plurality of tangentially spaced-apart seats intended for milling inserts having at least one cutting edge, with the cutting edges of the series being arranged to machine a common surface in a workpiece, the cutting edges or seats of the series being arranged in such a way that, within the series, a first angle between a radius that intersects a first cutting edge and a radius that intersects another cutting edge, which is situated closest to the first cutting edge in a direction of rotation around the rotation axis, is smaller than a second angle between the radius that intersects the first cutting edge and a radius that intersects another cutting edge, which is situated closest to the first cutting edge in a direction opposite said direction of rotation, the first and second angle being in a radial plane perpendicular to the rotation axis, and within the first and second angle, respectively, there is an absence of any other cutting edge of the same series,
wherein, within the series, a radial distance of the first cutting edge to the rotation axis is larger than a radial distance of the another cutting edge, which is situated closest to the first cutting edge in the direction opposite said direction of rotation, to the rotation axis, said radial distances to the rotation axis lying in said radial plane, and
wherein, within the series, the radial distance of the first cutting edge to the rotation axis and the radial distance of the another cutting edge, which is situated closest to the first cutting edge in the direction opposite said direction of rotation, to the rotation axis are set in relation to the respective angles such that the first cutting edge and the another cutting edge, which is situated closest to the first cutting edge in the direction opposite said direction of rotation, cut chips from a work piece that have essentially the same chip thickness, said radial distances to the rotation axis lying in said radial plane.

2. Device for milling of materials, comprising a milling cutter body that is connectable to a rotatable spindle or holder and defines a rotation axis, the milling cutter body being provided with at least one series of a plurality of tangentially spaced-apart cutting edges or a plurality of tangentially spaced-apart seats intended for milling inserts having at least one cutting edge, with the cutting edges of the series being arranged to machine a common surface in a workpiece, the cutting edges or seats of the series being arranged in such a way that, within the series, a first angle between a radius that intersects a first cutting edge and a radius that intersects another cutting edge, which is situated closest to the first cutting edge in a direction of rotation around the rotation axis, is smaller than a second angle between the radius that intersects the first cutting edge and a radius that intersects another cutting edge, which is situated closest to the first cutting edge in a direction opposite said direction of rotation, the first and second angle being in a radial plane perpendicular to the rotation axis, and within the first and second angle, respectively, there is an absence of any other cutting edge of the same series,
wherein, within the series, a radial distance of the first cutting edge to the rotation axis is larger than a radial distance of the another cutting edge, which is situated closest to the first cutting edge in the direction opposite said direction of rotation, to the rotation axis, said radial distances to the rotation axis lying in said radial plane, and
wherein the cutting edges of the series are arranged to cut chips from a workpiece that have essentially the same chip thickness as the chip thickness of the chips that are cut by the other cutting edges in the same series.

3. The device according to claims 1 or 2, wherein the milling cutter body is provided with at least one series of a plurality of tangentially spaced-apart cutting edges.

4. The device according to claim 3, wherein the cutting edges are integrated with the milling cutter body.

5. The device according to claim 4, wherein the milling cutter body has a first end portion and an opposite second end portion, the rotation axis of the milling cutter body extending between said two end portions, wherein the milling cutter body comprises a plurality of chutes that extend from the first end portion toward the second end portion, and wherein the respective cutting edge is arranged between two chutes.

6. The device according to claims 1 or 2, wherein the milling cutter body is provided with at least one series of a plurality of tangentially spaced-apart seats intended for milling inserts having at least one cutting edge.

7. The device according to claim 6, wherein the respective seat has a shoulder surface against which the milling insert is pressable to fix the radial position of the milling insert in relation to the rotation axis of the milling cutter body, and wherein, within the series, the radial distance of at least a first shoulder surface, against which a first milling insert carrying the first cutting edge is pressable, to the rotation axis is larger than the radial distance of at least one other shoulder surface, against which another milling insert carrying the another cutting edge, which is situated closest to the first cutting edge in the direction opposite said direction of rotation, is pressable, to the rotation axis.

8. The device according to claim 6, wherein the respective milling insert has a clearance surface to which the cutting edge of the milling insert connects and a second surface opposite the clearance surface, and wherein, within the series, the distance of at least a first cutting insert, which is carrying the first cutting edge, between the clearance surface thereof and the second surface thereof is larger than the distance between the clearance surface and the second surface of at least another milling insert, which is carrying the another cutting edge situated closest to the first cutting edge in the direction opposite said direction of rotation.

9. The device according to claims 1 or 2, wherein the first angle differs from the second angle by at least one percent.

10. The device according to claims 1 or 2, wherein the milling cutter body is arranged for end milling and/or face milling of materials.

11. Method for setting and/or making a device according to claims 1 or 2, wherein the method comprises the following steps:
   determining the number of cutting edges in one and the same series,
   within the series, setting a first angle between a radius that intersects a first cutting edge and a radius that intersects another cutting edge, which is situated closest to the first cutting edge in a direction of rotation around the rotation axis, smaller than a second angle between the radius that intersects the first cutting edge and a radius that intersects another cutting edge, which is situated closest to the first cutting edge in a direction opposite said direction of rotation, the first and second angles being in a radial plane perpendicular to the rotation axis, and within the first and second angle, respectively, there is an absence of any other cutting edge of the same series, determining the tooth feed of the milling operation, and
   within the series, setting a radial distance of the first cutting edge to the rotation axis larger than a radial distance of the another cutting edge, which is situated closest to the first cutting edge in the direction opposite said direction of rotation, to the rotation axis, based on the determined tooth feed and set angles between the cutting edges in the radial plane, said radial distances to the rotation axis lying in said radial plane.

* * * * *